United States Patent
Samie et al.

(10) Patent No.: US 10,323,696 B2
(45) Date of Patent: Jun. 18, 2019

(54) DYNAMIC LATCHING MECHANISMS FOR SELECTABLE CLUTCHES OF MOTOR VEHICLE POWERTRAINS

(71) Applicant: GM GLOBAL TECHNOLOGY OPERATIONS LLC, Detroit, MI (US)

(72) Inventors: Farzad Samie, Franklin, MI (US);
Derek F. Lahr, Howell, MI (US);
Chunhao J. Lee, Troy, MI (US);
Norman K. Bucknor, Troy, MI (US);
Dongxu Li, Troy, MI (US)

(73) Assignee: GM Global Technology Operations LLC., Detroit, MI (US)

( * ) Notice: Subject to any disclaimer, the term of this patent is extended or adjusted under 35 U.S.C. 154(b) by 107 days.

(21) Appl. No.: 15/619,776

(22) Filed: Jun. 12, 2017

(65) Prior Publication Data

US 2018/0355923 A1    Dec. 13, 2018

(51) Int. Cl.
*B60K 6/54* (2007.10)
*B60K 17/02* (2006.01)
*F16D 15/00* (2006.01)
*F16D 19/00* (2006.01)

(52) U.S. Cl.
CPC ............. *F16D 15/00* (2013.01); *B60K 17/02* (2013.01); *F16D 19/00* (2013.01); *B60K 6/54* (2013.01)

(58) Field of Classification Search
None
See application file for complete search history.

(56) References Cited

U.S. PATENT DOCUMENTS

| 4,860,861 A | 8/1989 | Gooch et al. |
| 5,947,243 A | 9/1999 | MacDonald |
| 6,290,044 B1 * | 9/2001 | Burgman ............... F16D 41/18 |
| | | 188/82.3 |
| 6,367,604 B1 * | 4/2002 | Kerr ........................ F16D 15/00 |
| | | 192/105 B |

(Continued)

FOREIGN PATENT DOCUMENTS

EP    0200335 A2    11/1986

OTHER PUBLICATIONS

Hybrid Powertrain System—Major Components.

*Primary Examiner* — Drew J Brown
(74) *Attorney, Agent, or Firm* — Quinn IP Law

(57) ABSTRACT

Disclosed are latching mechanisms for engine disconnect devices, methods for making and for using such latching mechanisms, and motor vehicles with a disconnect device for coupling/decoupling an engine with a torque converter (TC). A disconnect clutch for selectively connecting an engine with a TC includes a pocket plate that movably mounts to the TC. The pocket plate includes pockets movably seating therein struts that engage notches in a notch plate to lock the pocket plate to the notch plate. A selector plate moves between deactivated and activated positions such that the struts shift into and out of engagement with the notch plate notches, respectively. An activation device is selectively actuable to move the selector plate between activated and deactivated positions. A latching mechanism automatically transitions to a latched state responsive to the selector plate being activated. When latched, this latching mechanism retains the selector plate in the activated position.

20 Claims, 3 Drawing Sheets

(56) References Cited

U.S. PATENT DOCUMENTS

| | | | |
|---|---|---|---|
| 6,481,551 B1* | 11/2002 | Ruth | F16D 41/125 |
| | | | 192/103 C |
| 7,198,587 B2 | 4/2007 | Samie et al. | |
| 7,681,675 B2 | 3/2010 | Samie et al. | |
| 7,862,437 B2 | 1/2011 | Clark et al. | |
| 7,878,935 B2 | 2/2011 | Lahr | |
| 7,931,561 B2 | 4/2011 | Otanez et al. | |
| 7,980,992 B2 | 7/2011 | Sturgin | |
| 8,011,464 B2 | 9/2011 | Samie et al. | |
| 8,042,670 B2 | 10/2011 | Bartos et al. | |
| 8,425,364 B2 | 4/2013 | Lahr | |
| 8,499,912 B2 | 8/2013 | Samie et al. | |
| 2005/0126878 A1 | 6/2005 | Samie | |
| 2005/0279602 A1* | 12/2005 | Ruth | F16D 41/125 |
| | | | 192/48.3 |
| 2013/0126290 A1* | 5/2013 | Parameswaran | F16D 15/00 |
| | | | 192/45.001 |
| 2014/0110207 A1* | 4/2014 | Davis | F16D 41/08 |
| | | | 192/45.1 |
| 2015/0369300 A1* | 12/2015 | Biermann | F16D 13/52 |
| | | | 192/70.11 |
| 2016/0201739 A1* | 7/2016 | Kimes | F16D 27/108 |
| | | | 192/84.92 |
| 2016/0290417 A1* | 10/2016 | Brubaker | F16D 41/16 |
| 2017/0037914 A1* | 2/2017 | Hibino | F16D 41/125 |
| 2017/0268585 A1* | 9/2017 | Heitzenrater | F16D 25/00 |
| 2018/0017121 A1* | 1/2018 | Lahr | F16D 67/06 |
| 2018/0073554 A1* | 3/2018 | Lewis | F16C 17/047 |

\* cited by examiner

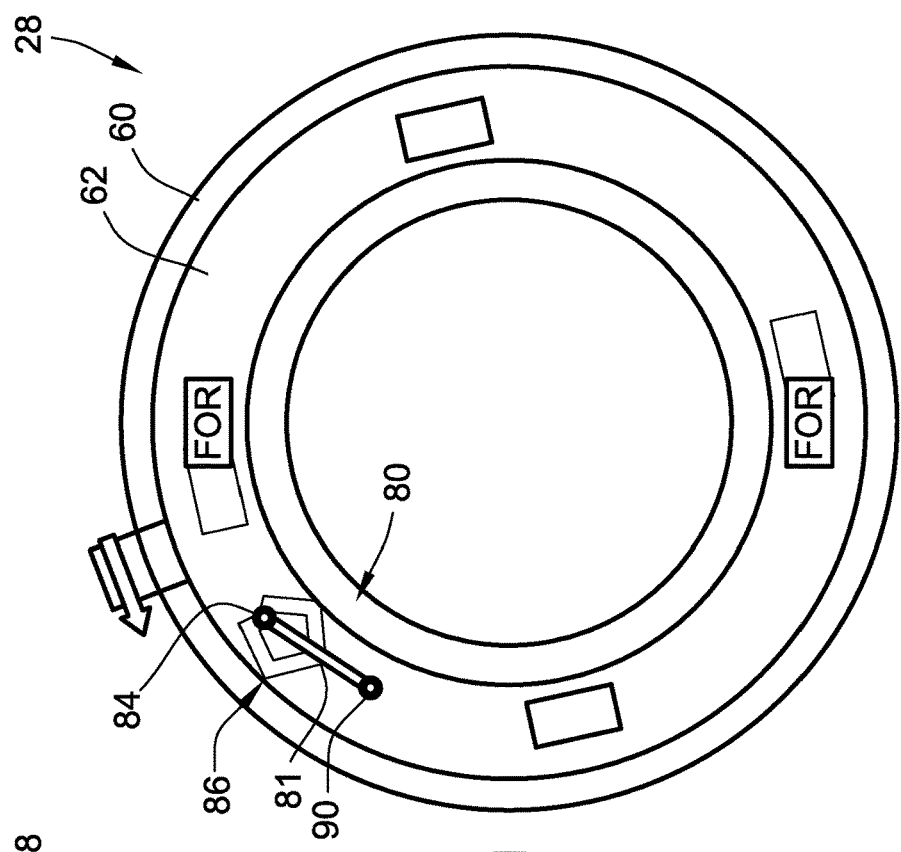
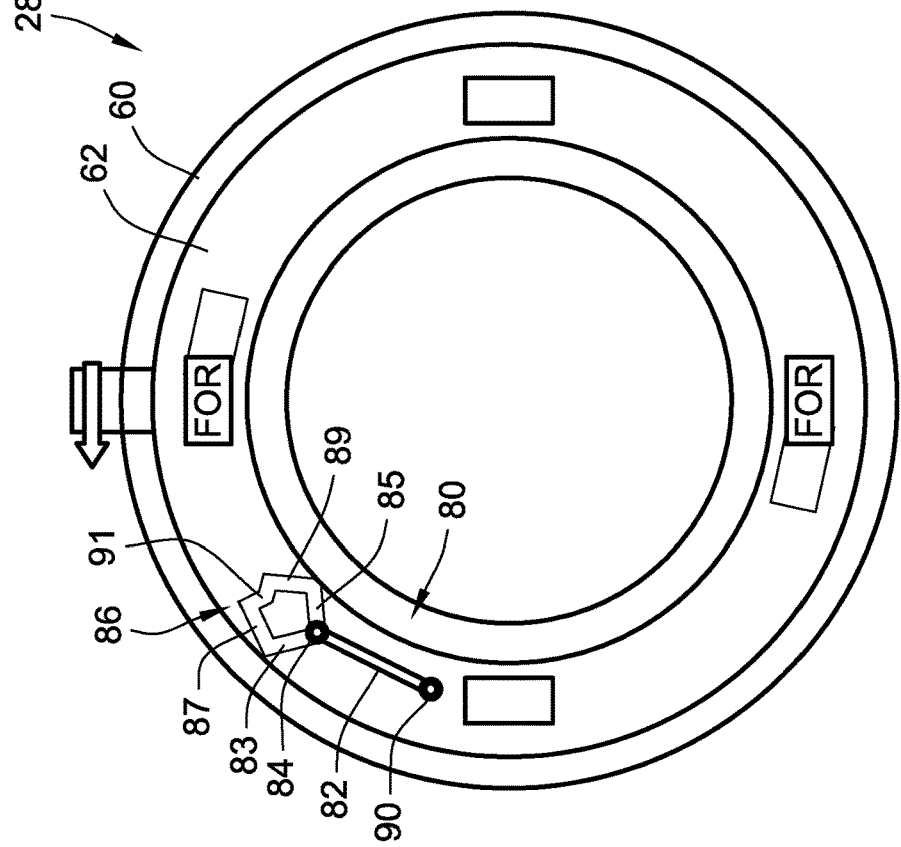

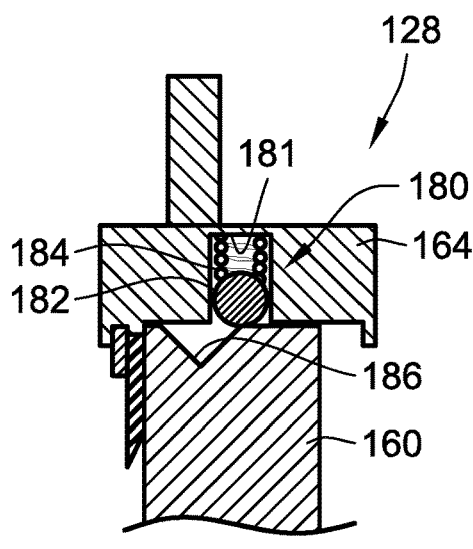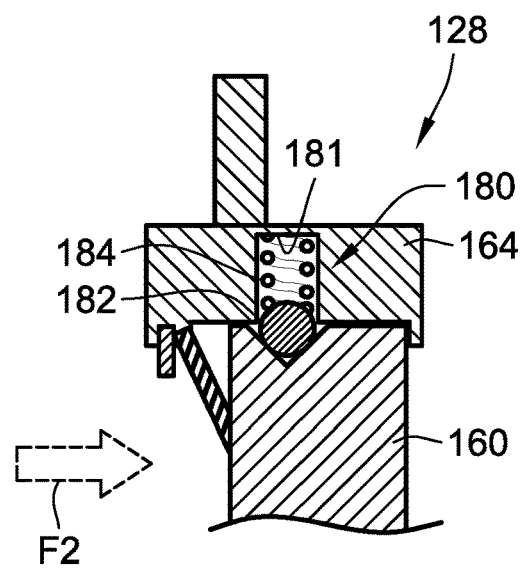
FIG. 4A  FIG. 4B
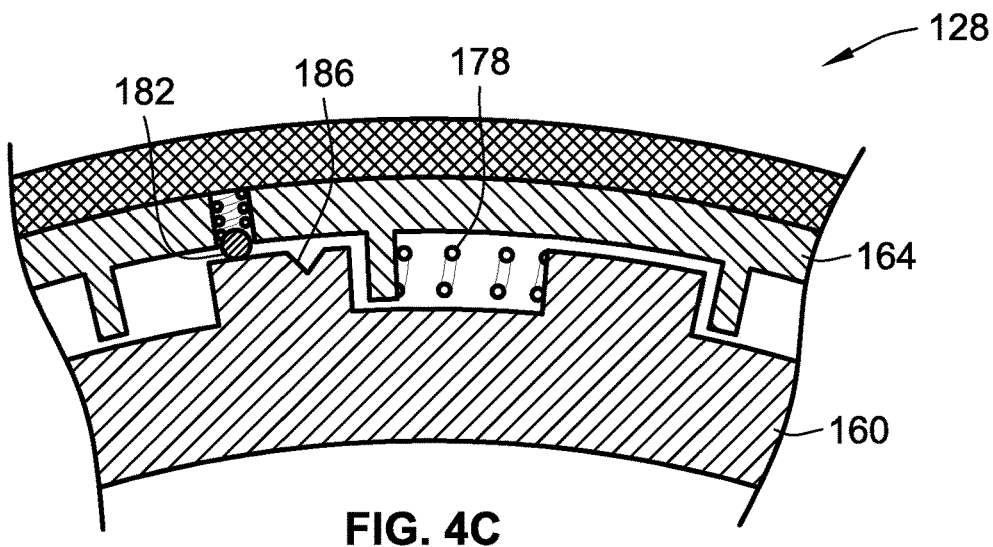
FIG. 4C
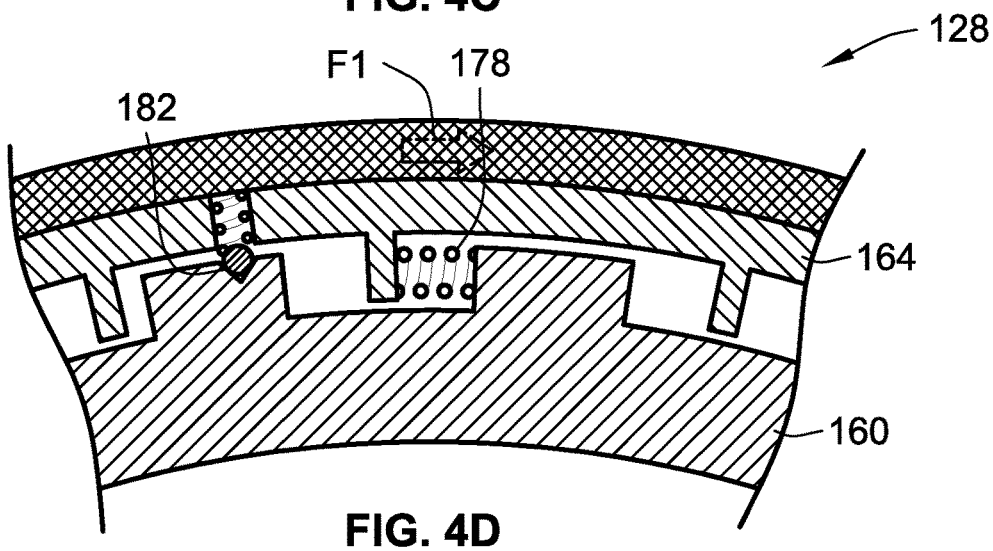
FIG. 4D

DYNAMIC LATCHING MECHANISMS FOR SELECTABLE CLUTCHES OF MOTOR VEHICLE POWERTRAINS

INTRODUCTION

The present disclosure relates generally to motor vehicle powertrains. More specifically, aspects of this disclosure relate to disconnect devices for operatively engaging and disengaging internal combustion engines with/from torque converters.

Current production motor vehicles, such as the modern-day automobile, are originally equipped with a powertrain that operates to propel the vehicle and power the onboard vehicle electronics. In automotive applications, the powertrain is generally typified by a prime mover that delivers driving power to the vehicle's final drive system (e.g., rear differential, axle, and wheels) through a manually or automatically shifted multi-speed power transmission. Automobiles have traditionally been powered by a reciprocating-piston type internal combustion engine (ICE) assembly because of its ready availability and relatively inexpensive cost, light weight, and overall efficiency. Such engines include compression-ignited (CI) diesel engines, spark-ignited (SI) gasoline engines, two, four and six-stroke architectures, and rotary engines, as some non-limiting examples. Hybrid and full-electric vehicles, on the other hand, utilize alternative power sources to propel the vehicle and minimize/eliminate reliance on an engine for power.

Hybrid vehicle powertrains utilize multiple traction power sources to propel the vehicle, such as an ICE assembly operating in conjunction with a battery-powered or fuel-cell-powered motor. A hybrid electric vehicle (HEV), for example, stores both electrical energy and chemical energy, and converts the same into mechanical power to drive the vehicle's road wheels. The HEV is generally equipped with an electric machine (E-machine), such as one or more electric motor/generators, that operate in parallel or in series with an internal combustion engine. Since hybrid vehicles are designed to derive their power from sources other than the engine, engines in HEVs may be turned off, in whole or in part, while the vehicle is propelled by the alternative power source(s). A full electric vehicle (FEV)—colloquially known as "all-electric" vehicles—is an alternative type of electric-drive vehicle configuration that altogether eliminates the internal combustion engine and attendant peripheral components from the powertrain system, relying solely on electric tractive motors for vehicle propulsion.

Vehicle powertrains employing an automatic transmission commonly interpose a hydrodynamic torque converter between the internal combustion engine and the multi-speed transmission to govern the transfer of rotational torque therebetween. Replacing the mechanical clutch of a manual transmission, a standard torque converter includes a fluid impeller that is coupled to the engine's output shaft, a turbine that is coupled to the transmission's input shaft, and a stator interposed between the impeller and turbine to regulate fluid flow between their respective fluid volumes. A hydraulic pump modulates hydraulic fluid pressure within the torque converter housing to regulate the transfer of rotational energy from the impeller to the turbine. Hydraulic fluid may be bled from the housing to increase slip or otherwise operatively disengage the engine crankshaft from the transmission input shaft and to multiply torque (e.g., function as a pseudo-reduction gear) to offset significant differences between input and output speeds.

A torque converter (TC) may generally be typified as a fluid coupling that allows the engine to selectively transmit power to the drivetrain system for vehicle propulsion, and allows the crankshaft to spin—without the engine stalling—when the vehicle wheels and transmission gears come to a stop. For instance, if the engine is rotating slowly, e.g., when the vehicle is braking to a stop or idling at a stop light, hydraulic pressure between the impeller and turbine is reduced such that the amount of torque passed through the torque converter to the transmission is very small. In so doing, the vehicle may be kept still with light pressure on the brake pedal. To accelerate the vehicle, the TC pump increases internal fluid pressure, thereby causing increased amounts of torque to be transmitted from the impeller through the turbine to the transmission for launching the vehicle. For manual transmissions, the torque converter is typically replaced with a driver-operated clutch engaged and disengaged by a foot pedal.

Some torque converters are equipped with a clutch mechanism that is engaged to rigidly connect the engine crankshaft to the transmission's input when their speeds are nearly equal, e.g., to avoid unwanted slippage and resultant efficiency losses. System "slip" occurs because the rotational speed of the impeller relative to the turbine in the torque converter is inherently different. A large slip percentage between the engine output and the transmission input affects the fuel economy of the vehicle; employing a torque converter clutch (TCC) helps to reduce the slip between the engine and the transmission. The TCC operates to mechanically lock the impeller, at the output of the engine, to the turbine, at the input of the transmission, so that the engine output and transmission input rotate at the same speed. Application of the TCC may be controlled by an electronic controller to modify clutch engaging forces under certain operating conditions, for example, during shifts to eliminate undesired torque fluctuations and engine speed changes during transient periods when torque flow interruption is desired.

SUMMARY

Disclosed herein are dynamic latching mechanisms for engine disconnect devices, methods for making and methods for implementing such latching mechanisms, and motor vehicles equipped with an internal combustion engine that is operatively coupled to/decoupled from a hydrokinetic torque converter via an intermediate disconnect device with a dynamic latching mechanism. By way of example, and not limitation, there is presented a novel selectable one-way clutch (SOWC) latching mechanism that is operable to latch the SOWC selector plate in an activated position, whereby the engaging elements of a corresponding SOWC pocket plate are maintained in a disengaged state. In so doing, the SOWC operatively disconnects an engine assembly from a hydrodynamic torque converter and, thus, from a multi-speed power transmission such that the transfer of torque therebetween is effectively eliminated. This SOWC assembly employs a single solenoid, brake or other device to activate and to release the selector plate. The latching mechanism is designed to automatically latch when the selector plate is activated, and to automatically unlatch when the selector plate is released. The latching mechanism, however, does not require the continued operation of a solenoid or any other electronic device to stay latched or unlatched.

In an example, the latching mechanism is composed of a continuous, oblong-shaped channel cut into the pocket plate (or, alternatively, into the selector plate), and a latching bar hinged at one end thereof to the selector plate (or pocket plate). When the selector plate is activated, e.g., via a solenoid, a brake, or other torque-transmitting device, the latching bar pivots such that a pin at an unhinged end of the latching bar slides within the oblong channel to a detent portion in the channel. In so doing, the latching pin catches within the detent and prevents the selector plate from returning to the deactivated position. At this juncture, the solenoid can be disabled as the latching mechanism will retain the selector plate in the activated position against a rotation return force generated by the rotating pocket plate. When the selector plate is released, e.g., via a transient actuation of the solenoid, the latching pin automatically dislodges from the detent and allows the selector plate to return to the deactivated position. The pocket plate, which may be rigidly mounted into a slot in the TC front cover, includes engaging elements, such as rotatable pawls, sprags, rollers, needles, etc., that may default to operatively engage notches in a notch plate attached to the engine's crankshaft and thereby lock the pocket plate to the notch plate for common rotation therewith.

Attendant benefits for at least some of the disclosed features include an engine disconnect device with a dynamic latching assembly that helps to reduce electrical energy consumption otherwise required to continuously actuate the solenoid and maintain the selector plate in the activated position and, thus, keep the pocket plate in the disengaged state. This is particularly beneficial for hybrid vehicle powertrains, especially P2 hybrid architectures, where the engine may need to be operatively disconnected from the final drive system for prolonged periods of time. Aspects of the disclosed concepts also help to reduce the likelihood of self-actuation of the SOWC. Disclosed engine disconnect latching mechanism designs may also reduce wear and tear on the activation device by minimizing its overall use. Disclosed disconnect devices and latching assemblies can be incorporated into both manual and automatic transmission architectures.

Aspects of the present disclosure are directed to controllable engine disconnect devices for operatively connecting and disconnecting an internal combustion engine assembly with/from a hydrokinetic torque converter. Disclosed, for example, is a disconnect clutch for selectively connecting an engine assembly with a torque converter. The disconnect clutch includes a pocket plate that attaches to the torque converter, and a notch plate that attaches to the output shaft of the engine assembly. This pocket plate includes a series of pockets, e.g., circumferentially spaced around the perimeter of the plate. Similarly, the notch plate includes a series of notches, e.g., circumferentially spaced around the perimeter of the notch plate. The engine disconnect clutch also includes multiple engaging elements seated in the pocket plate pockets (or the notch plate notches). These engaging elements, which may be in the nature of pawls, sprags, struts, rollers, etc., engage the pockets with the notches to thereby lock the pocket plate to the torque converter such that they rotate in unison. In an example, the engaging elements are spring-biased struts pivotably seated within the pockets of the pocket plate. A selector plate, which is interposed between the pocket plate and the notch plate, selectively moves between deactivated and activated positions. When the selector plate is deactivated, the engaging elements of the pocket plate shift into engagement between the pockets and the notches. Conversely, when activated, the selector plate pushes or otherwise shifts the engaging elements out of engagement such that the notch plate can move with respect to the TC. As used herein, the terms "pocket" and "notch" and any permutations thereof may be defined to include any structural feature of the disconnect device recessed, flat, protruding or otherwise by which an engaging element, such as the disclosed struts, pawls, etc., physically mounts and/or engages to transmit torque.

An activation device, which may be in the nature of a solenoid-driven brake, is mounted in operative engagement with the selector plate. This activation device is selectively actuable, e.g., via an onboard vehicle controller or powertrain control module, to move the selector plate from the deactivated position to the activated position. A latching mechanism is interposed between and operable to latch the pocket plate and the selector plate. The latching mechanism is designed to automatically transition from an unlatched state to a latched state in response to the activation device moving the selector plate to the activated position. When in the latched state, this latching mechanism retains the selector plate in the activated position, even after deactuation of the activation device. The latching mechanism is designed to automatically transition from the latched state to the unlatched state in response to the activation device releasing the selector plate.

Other aspects of the present disclosure are directed to motor vehicles equipped with a reciprocating-piston-type internal combustion engine assembly operatively connected to a multi-speed power transmission by a hydrokinetic torque converter. A "motor vehicle," as used herein, may include any relevant vehicle platform, such as passenger vehicles (ICE, hybrid electric, fuel cell hybrid, fully or partially autonomous, etc.), commercial vehicles, industrial vehicles, tracked vehicles, off-road and all-terrain vehicles (ATV), farm equipment, boats, airplanes, etc. A motor vehicle is presented that includes a vehicle body with an engine compartment, and an ICE assembly mounted inside the engine compartment. The ICE assembly includes a crankshaft for outputting torque generated by the ICE assembly to the vehicle drivetrain. A multi-speed power transmission receives, selectively modifies, and transmits torque output by the ICE assembly to one or more of the vehicle's drive wheels. A hydrodynamic torque converter operatively connects and disconnects the ICE assembly to/from the multi-speed transmission to govern the transfer of torque therebetween.

Continuing with the above example, the motor vehicle also includes a SOWC with a pocket plate that is rotatably mounted to an exterior portion of the torque converter, and a notch plate that is attached to the engine crankshaft, e.g., via a flex plate. The pocket plate includes a series of circumferentially spaced pockets, and the notch plate includes a series of circumferentially spaced notches. Movably seated within the pockets (or notches) are multiple engaging elements, such as spring-biased struts. These engaging elements selectively engage the pockets with the notches to thereby lock the pocket plate to the notch plate for common rotation therewith. A selector plate, which is located adjacent the pocket plate, moves between a deactivated position, whereat the pocket plate's engaging elements shift into engagement with the TC input structure, and an activated position, whereat the selector plate shifts the engaging elements out of engagement with the input structure. An activation device is selectively actuable to move the selector plate between activated and deactivated positions. A latching mechanism is interposed between and operable to latch the pocket plate and the selector plate. This latching mechanism is configured to automatically transition from an unlatched state to a latched state in response to the activation device moving the selector plate to the activated position. The latching mechanism, when in the latched state, retains the selector plate in the activated position upon disabling the selector plate activation device.

Additional aspects of the present disclosure are directed to methods for making and methods for assembling any of the disclosed engine disconnect devices and corresponding latching assemblies. Aspects of the present disclosure are also directed to methods for operating disclosed engine disconnect devices and latching assemblies. Also presented herein are non-transitory, computer readable media storing instructions executable by at least one of one or more processors of one or more in-vehicle electronic control units, such as a programmable engine control unit (ECU) or powertrain control module, to govern operation of a disclosed engine disconnect device.

The above summary is not intended to represent every embodiment or every aspect of the present disclosure. Rather, the foregoing summary merely provides an exemplification of some of the novel aspects and features set forth herein. The above features and advantages, and other features and advantages of the present disclosure, will be readily apparent from the following detailed description of illustrative embodiments and representative modes for carrying out the present disclosure when taken in connection with the accompanying drawings and the appended claims. Moreover, this disclosure expressly includes any and all combinations and subcombinations of the elements and features presented above and below.

BRIEF DESCRIPTION OF THE DRAWINGS

FIGS. 3A and 3B are front-view illustrations of the representative engine disconnect clutch of FIG. 2 shown with an example of a latching mechanism in an unlatched state (FIG. 3A) and a latched state (FIG. 3B) in accordance with aspects of the present disclosure.

FIGS. 4A and 4B are cross-sectional side-view illustrations of another representative engine disconnect clutch shown with another example of a latching mechanism in an unlatched state (FIG. 4A) and a latched state (FIG. 4B) in accordance with aspects of the present disclosure.

FIGS. 4C and 4D are cross-sectional front-view illustrations of the representative engine disconnect clutch of FIGS. 4A and 4B, respectively.

Figure 1:
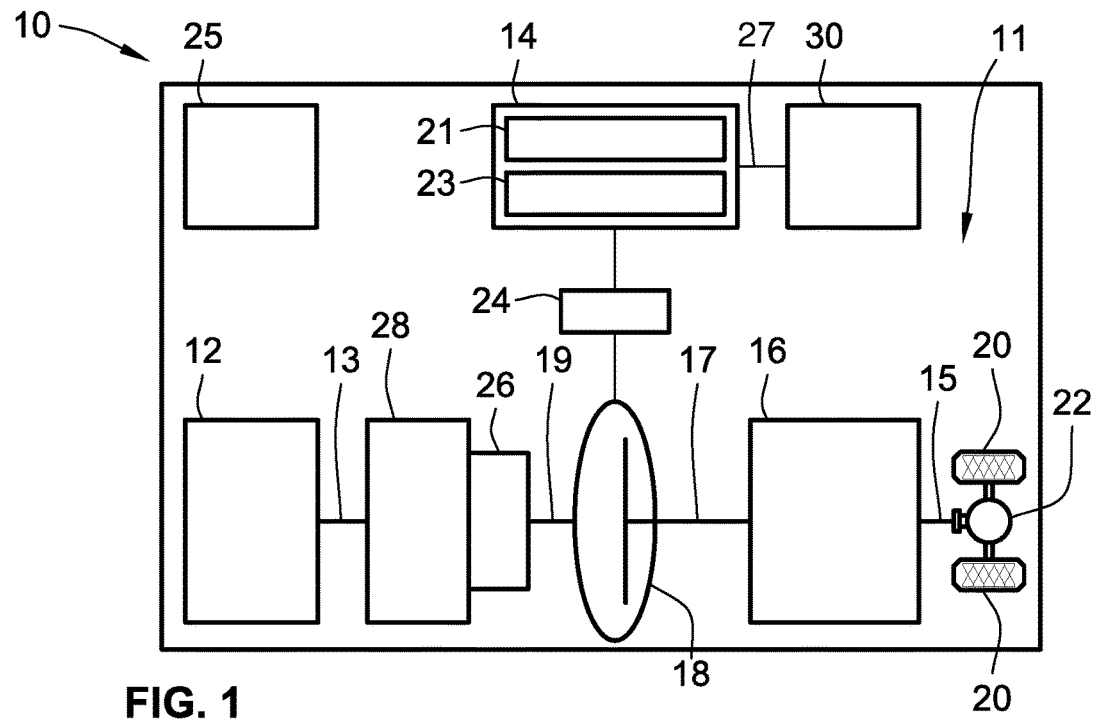
FIG. 1 is a schematic illustration of a representative motor vehicle with a powertrain having a final drive system drivingly connected to an engine assembly by a multi-speed power transmission in accordance with aspects of the present disclosure.

The present disclosure is amenable to various modifications and alternative forms, and some representative embodiments have been shown by way of example in the drawings and will be described in detail herein. It should be understood, however, that the novel aspects of this disclosure are not limited to the particular forms illustrated in the appended drawings. Rather, the disclosure is to cover all modifications, equivalents, combinations, subcombinations, permutations, groupings, and alternatives falling within the scope of this disclosure as defined by the appended claims.

DETAILED DESCRIPTION

This disclosure is susceptible of embodiment in many different forms. There are shown in the drawings and will herein be described in detail representative embodiments of the disclosure with the understanding that these illustrated examples are to be considered an exemplification of the disclosed principles and do not limit the broad aspects of the disclosure to the representative embodiments. To that extent, elements and limitations that are disclosed, for example, in the Abstract, Summary, and Detailed Description sections, but not explicitly set forth in the claims, should not be incorporated into the claims, singly or collectively, by implication, inference or otherwise. For purposes of the present detailed description, unless specifically disclaimed: the singular includes the plural and vice versa; the words "and" and "or" shall be both conjunctive and disjunctive; the word "all" means "any and all"; the word "any" means "any and all"; and the words "including" and "comprising" and "having" and synonyms thereof mean "including without limitation." Moreover, words of approximation, such as "about," "almost," "substantially," "approximately," and the like, may be used herein in the sense of "at, near, or nearly at," or "within 3-5% of," or "within acceptable manufacturing tolerances," or any logical combination thereof, for example.

Referring now to the drawings, wherein like reference numbers refer to like features throughout the several views, there is shown in FIG. 1 a schematic illustration of a representative automobile, which is designated generally at 10 and portrayed herein for purposes of discussion as a passenger vehicle with a two-clutch parallel (P2) hybrid-electric powertrain. In particular, the illustrated powertrain is generally composed of a single engine 12 and a single motor 14 that operate, individually or in concert, to transmit tractive power to a multi-speed power transmission 16 through a hydrokinetic torque converter 18 to drive one or more drive wheels 20 of the vehicle's drivetrain 11. The illustrated automobile 10—also referred to herein as "motor vehicle" or "vehicle" for short—is merely an exemplary application with which novel aspects and features of this disclosure can be practiced. In the same vein, implementation of the present concepts into a P2 hybrid-electric architecture should also be appreciated as an exemplary application of the novel concepts disclosed herein. As such, it will be understood that aspects and features of the present disclosure can be applied to other vehicle powertrain configurations and utilized for any logically relevant type of motor vehicle. Lastly, only select components of the vehicle have been shown and will be described in additional detail herein. Nevertheless, the vehicles and powertrains discussed below can include numerous additional and alternative features, and other well-known peripheral components, e.g., for carrying out the various methods and functions of this disclosure.

The representative vehicle powertrain system is shown in FIG. 1 with a prime mover, such as a restartable internal combustion engine (ICE) assembly 12 that is drivingly connected to a driveshaft 15 of a final drive system 11 by a multi-speed automatic power transmission 16. The engine 12 transfers power, preferably by way of torque via an engine crankshaft 13, to an input side of the transmission 16. As shown, the prime mover 12 directly drives an engine disconnect device 28 which, when operatively engaged, drives the TC 18 via a torsional damper assembly 26. When operatively engaged, the engine disconnect device 28 transmits torque received from the ICE 12 by way of the damper 26 to input structure of the TC 18. The transmission 16, in turn, is adapted to receive, manipulate and distribute power from the engine 12 to the final drive system 11—represented herein by a rear differential 22 and a pair of rear drive wheels 20—and thereby propel the hybrid vehicle. In the example depicted in FIG. 1, the ICE assembly 12 may be any available or hereafter developed engine, such as a 2 or 4-stroke compression-ignited diesel engine or a 4-stroke spark-ignited gasoline or flex-fuel engine, which is readily adapted to provide its available power output typically at a number of revolutions per minute (RPM). Although not explicitly portrayed in FIG. 1, it should be appreciated that the final drive system 11 may comprise any available configuration, e.g., front wheel drive (FWD), rear wheel drive (RWD), four-wheel drive (4WD), all-wheel drive (AWD), etc.

FIG. 1 also displays an electric motor/generator assembly 14 or other E-machine that operatively connects to a main shaft 17 of the electro-hydraulic transmission 16 via the torque converter 18. The motor/generator 14 can be directly coupled onto a TC input shaft 19 or a splined housing portion (e.g., front cover 38 of FIG. 2) of the torque converter 18 via one or more selectively engageable torque transmitting mechanisms 24 (e.g., clutch, brake, etc.). The electric motor/generator 14 is composed of an annular stator 21 circumscribing and concentric with a rotor 23. Electric power is provided to the stator 21 through electrical conductors or cables 27 that pass through the motor housing in suitable sealing and insulating feedthroughs (not illustrated). Conversely, electric power may be provided from the motor 14 to an onboard traction batter pack 30 via regenerative braking. Operation of any of the illustrated powertrain components may be governed by an onboard or remote vehicle controller, such as programmable electronic control unit (ECU) 25. While shown as a P2 hybrid-electric architecture with a single motor in parallel power-flow communication with a single engine assembly, the vehicle 10 may employ other powertrain configurations, including PS, P1, P3, and P4 hybrid powertrains, any of which may be adapted for an REV, BEV, plug-in, range-extended, or fuel-cell vehicle, as well as full-electric and standard ICE powertrains.

Control module, module, control, controller, control unit, processor and similar terms mean any one or various combinations of one or more of Application Specific Integrated Circuit(s) (ASIC), electronic circuit(s), central processing unit(s) (e.g., microprocessor(s)), and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any controller executable instruction sets including calibrations and look-up tables. The ECU can be designed with a set of control routines executed to provide the desired functions. Control routines are executed, such as by a central processing unit, and are operable to monitor inputs from sensing devices and other networked control modules, and execute control and diagnostic routines to control operation of devices and actuators. Routines may be executed at regular intervals, for example each 100 microseconds (μs), 3.125, 6.25, 12.5, 25 and 100 milliseconds during ongoing engine and vehicle operation. Alternatively, routines may be executed systematically, sporadically, and/or in response to the occurrence of a designated event.

Figure 2:
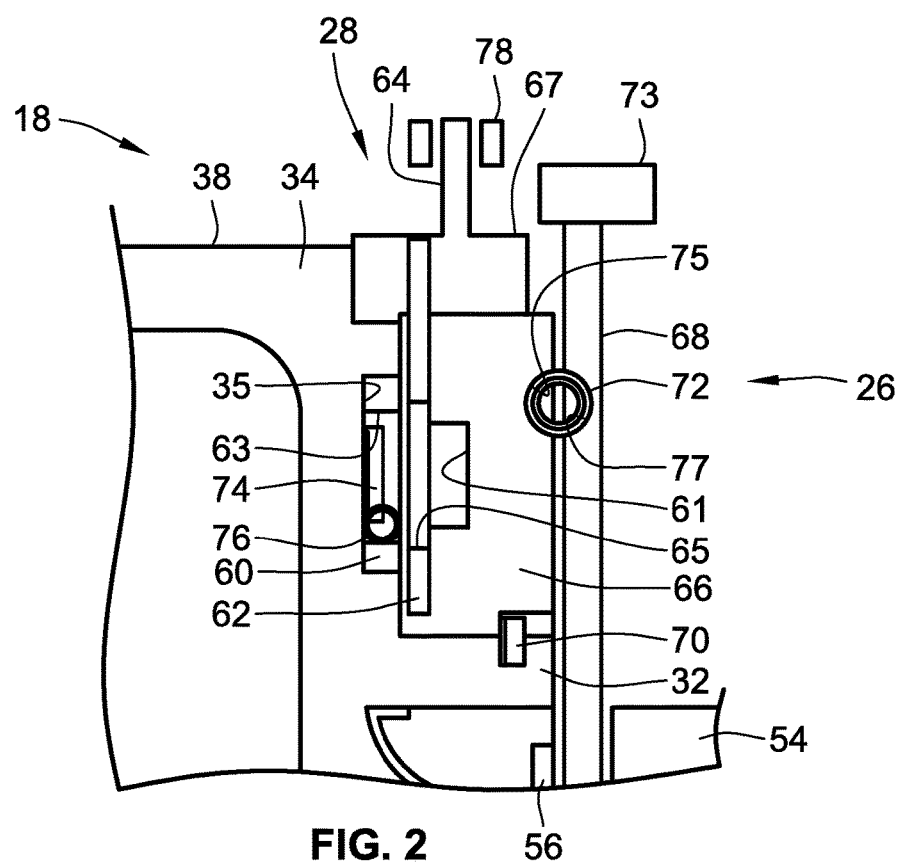
FIG. 2 is a cross-sectional side-view illustration of select portions of a representative hydrodynamic torque converter, engine disconnect clutch, and torsional damper assembly in accordance with aspects of the present disclosure.

FIG. 2 is a cross-sectional side-view illustration of a portion of a representative torque converter assembly 18. Hydrokinetic torque converter assembly 18 is a fluid coupling for operatively connecting and disconnecting the ICE assembly 12 and electric motor/generator assembly 14 to/from the internal epicyclic gearing of the power transmission 16. The torque converter assembly 18 may be generally comprised of a torque converter impeller, a bladed turbine, and a relatively stationary stator. The impeller—also referred to in the art as "pump"—is situated in serial power-flow fluid communication with the turbine. To protect these components, the torque converter assembly 18 is constructed with an annular housing, defined principally by an engine-side front cover 38 (also referred to herein as "pump housing") fixedly attached, e.g., via electron beam welding, MIG or MAG welding, laser welding, and the like, to a transmission-side pump shell portion such that a working hydraulic fluid chamber is formed therebetween.

Interposed between the impeller and turbine is a stator that selectively alters fluid flow returning from the turbine to the impeller such that returning fluid aids, rather than impedes, rotation of the impeller. The transfer of engine torque from the crankshaft 13 to the turbine, via the annular housing front cover 38 and impeller, is through the operation of hydraulic fluid, such as transmission oil in the TC fluid chamber. More specifically, rotation of impeller blades, retained between the pump shell and an inner shroud, causes the hydraulic fluid to be directed toroidally outward toward the turbine. When this occurs with sufficient force to overcome the inertial resistance to rotation, turbine blades, which are coaxially oriented with the impeller blades and retained between the inner shroud and a turbine shell, begin to rotate with the impeller. The fluid flow exiting the turbine is directed back into the impeller by way of the stator. The stator, located between the flow exit section of the turbine and the flow entrance section of the impeller, redirects fluid flow from the turbine to the impeller in the same direction as impeller rotation, thereby reducing pump torque and causing torque multiplication.

The stator may be connected to a stator shaft by way of a roller clutch that is operable to prevent rotation of the stator at low torque converter speeds. At higher torque converter speeds, the direction of hydraulic fluid leaving the turbine changes, causing the stator to over-run the roller clutch and rotate freely on the stator shaft. The impeller, on the other hand, may be secured to a pump hub, whereas the turbine—namely turbine blades and turbine shell—is rotatably mounted onto a TC output shaft. A turbine hub is disposed between, and configured to operatively couple together the turbine and the TC output shaft. The turbine hub may be secured to the turbine shell, for example, by a series of rivets, and engages the TC output shaft, for example, by a splined interface Fundamentally, as the internal combustion engine 12 turns off to on, on to off, and operates at different rotational speeds during transient modes, it may produce torque-related vibrations and oscillations (colloquially known as "torsionals"). By way of example, when fuel is being fed to the engine 12 and it is under power, e.g., through engagement of a fuel throttle during normal operation, the engine 12 may produce torsionals that are undesirable to transmit to, and through, the transmission 16. In addition, when the engine 12 is not being fueled or is not under power (e.g., in a startup and/or a shutdown operation), the engine pistons may generate compression pulses. Both the torsionals and compression pulses can produce resultant vibrations, noise and rattle that may be sensed by a vehicle occupant. To help reduce or otherwise cancel out the torsionals, torque swings and compression pulses that may be produced by the engine 12, the vehicle 10 is equipped with an engine disconnect device 28 and damper assembly 26. As will be described in detail below, the damper assembly 26 generally functions to isolate the torque converter 18 and, thus, the transmission 12 from unwanted torsionals generated by the engine 12, and also to selectively aide the motor/generator assembly 14 in canceling engine compression pulses during startup and shutdown operations.

According to the representative example illustrated in FIG. 2, the engine disconnect device 28 is generally comprised of a pocket plate 60, a selector plate 62, a braking ring 64, a notch plate 66, and a flex plate 68 (positioned in that order, from TC 18 to ICE 12 in FIG. 2). In the same vein, the damper assembly 26 of FIGS. 2 and 3 is generally comprised of the notch plate 66, flex plate 68, and one or more spring systems 72 sandwiched between the notch and flex plates 66, 68. As shown, the notch plate 66 is interposed between and coaxially aligned with the pocket and flex plates 60, 68, with the braking ring 64 concentric with all four plates 60, 62, 66, 68. The disconnect device 28 may also include a retaining ring 70 aligning the notch plate 66 on the pump housing 38, and applying a suitable axial retaining force to retain the pocket plate 60 with respect to the notch plate 66. During operation of the device 28, the force transmitted between the pocket plate 60 and notch plate 66 includes both axial and radial components; the axial component exerts a separating force between the pocket plate 60 and the notch plate 66. The retaining ring 70 (see FIG. 2) is installed in a retaining ring groove provided within the front cover 38 to serve as the reaction member for this axial force.

Pocket plate 60 functions, in part, to rigidly attach the engine disconnect device 28 and, indirectly, the damper assembly 26 to the torque converter 18. By way of non-limiting example, the TC pump housing 38 is integrally formed with a generally cylindrical hub portion 32 that projects orthogonally from a disk-shaped flange portion 34. Pocket plate 60 may be fabricated as a disk-shaped annulus that is mounted on or into the pump housing 38 such that the torque converter 18 and engine disconnect device 28 are coaxially aligned to both rotate about a common axis. To operatively align and retain the pocket plate 60, the flange portion 34 of the TC pump housing 38 may be fabricated with an annular slot 35 that extends in a continuous manner along the engine-side face of the housing 38. In this example, the pocket plate 60 has an internal bore and an outer-diameter periphery, the latter of which is equipped with externally-projecting teeth or external splines that engage or otherwise mate with internally-projecting splines or teeth (not shown) of the slot 35. A radially extending fork slot (not shown), which may be formed through the pocket plate 60, provides an opening suitable for receiving therethrough a selector fork or lever (not shown) manipulable for selectively repositioning the selector plate 62.

Engine disconnect device 28 is portrayed herein for purposes of discussion as a strut-type selectable one way clutch (SOWC). Alternatively, the engine disconnect device 28 may take on other available constructions, such as selectable roller or needle clutches, controllable mechanical diode clutches, and sprag or pawl clutch designs, as a few non-limiting examples. This disclosure contemplates that other selectable, reversible and multi-mode torque transmitting devices could be used to effectuate the features of the present disclosure. Pocket plate 60 of FIG. 2, for example, is fabricated with a sequence of circumferentially spaced pockets 63 (one of which is visible in FIG. 2) that are recessed into or extending through a forward-facing, engine-side surface of the plate 60. Each pocket 63 movably nests therein a respective engaging element that functions to engage with torque-transmitting structure of the notch plate 66. In so doing, the engaging elements cooperatively lock the pocket plate 28 (and the torque converter 18) to the notch plate 66 (and the crankshaft 13) such that these components all rotate in unison with one another. According to the representative architecture of FIG. 2, each engaging element is composed of a spring-biased strut 74 that is pivotably seated within a respective one of the aforementioned pockets 63. Each strut 74 is provided with a respective biasing member 76, which can be a torsion spring, coil spring, constant force spring, or any other element capable of providing lift to one end of the engaging element.

Notch plate 66 functions, in part, to operatively attach the flex plate 68 and, indirectly, the crankshaft 13 to the torque converter 18 via the pocket plate 60 such that torque can be transmitted therebetween. The torque-transmitting structure of the notch plate 66 is generally comprised of circumferentially spaced notches 61 (one of which is visible in FIG. 2) that are individually recessed into a transmission-side, aft-facing surface of the plate 66. This series of notches 61 is radially aligned with the pockets 63 in the pocket plate 60, each shaped and sized to receive therein a portion of a strut 74. The struts 74 engage the notch plate 66—thereby locking the pocket plate 60 and torque converter 18 to the notch plate 66 and flex plate 68 for common rotation therewith—by projecting forward (rightward in FIG. 2) into and pressing against the notches 61. Conversely, the struts 74 selectively disengage the notch plate 66—thereby unlocking the pocket plate 60 from the notch plate 66 such that the notch plate 66 freewheels on the hub 32—by receding into their respective pockets 63 out of contact with the notches 61. It will be apparent that the number, arrangement and geometry of the engaging elements 74 and their corresponding pockets 63 can be varied from that which are shown in the drawings depending, for example, on design requirements for the intended application. The same can be said of the notches 61 in the notch plate 63. In this regard, while shown rotatably seated within the pocket plate pockets 63 and selectively operable to project into engagement with the notch plate notches 61, struts 74 may alternatively be borne by the notch plate 66 and project into engagement with the pocket plate 60. It is further envisioned that the pocket plate 60 be eliminated altogether such that the struts 74 engage the torque converter 18 directly with the notch plate 66

To govern the operating status of the engine disconnect device 28 and, thus, the torque-transmitting mechanical coupling between the engine assembly 12 and torque converter 18, the disconnect device 28 is provided with a selector plate 62 and braking ring 64 that cooperatively control the engagement and disengagement of the struts 74 between the pocket plate 60 and notch plate 66. The selector plate 62 is a disk-shaped annulus neighboring the pocket plate 60 and coaxially aligned with the torque converter 18 and damper assembly 26 on the common axis of rotation mentioned above. This selector plate 62 is mounted for rotational movement relative to the pocket plate 60 to transition back-and-forth between a deactivated state/position and an activated state/position. When the selector plate 62 is in its deactivated position, the engaging elements 74 of the pocket plate 60 are allowed to shift into engagement with the notches 61 of the notch plate 66, e.g., under the biasing force of the biasing members 76. On the other hand, when the selector plate 62 rotates to its activated position, the plate 62 presses or otherwise shifts the engaging elements 74 out of engagement with the notch plate 66. By way of example, and not limitation, the selector plate 62 is machined with a series of circumferentially spaced windows 65, each of which is shaped and sized and positioned to receive therethrough a portion of a single strut 74. Moving the selector plate 62 to the deactivated position aligns the windows 65 with corresponding pockets 63 such that the struts 74 seated therein project through the windows 65 and into the notches 61 of the notch plate 66. Conversely, moving the selector plate 62 to the activated position misaligns the windows 65 with the pockets 63 such that the struts 74 are pressed back into the pockets 63 via the plate 62. A selector plate default position with respect to the pocket plate, such as the deactivated position, may be set by spring or other biasing member.

The braking ring 64 of FIGS. 2 and 3 is a disc-shaped component with a centrally located cylindrical hub 67 that is sized to circumscribe and seat therein the SOWC notch plate 66. In particular, when the engine disconnect device 28 is fully assembled, an aft-facing, transmission-side surface of the braking ring 64 sits generally flush against a forward-facing engine-side surface of the TC front cover 38, while an inner-diameter surface of the central hub 67 sits generally flush with an outer periphery surface of the notch plate 66, as best seen in FIG. 2. Circumferentially spaced tabs (not shown) project from the selector plate 62 into complementary slots in the braking ring 64 to operatively interconnect the two components such that they move in unison. A selectively engageable activation device 78, which may be in the nature of a solenoid-driven brake, is activated by a vehicle controller, such as ECU 25 of FIG. 1, to restrict rotational motion of the braking ring 64. In so doing, the ring 64 is selectively transitioned back-and-forth from between deactivated and activated positions to thereby move the selector plate 62 between corresponding deactivated and activated positions, respectively.

An engine flex plate 68, which is immediately adjacent both the notch plate 66 and the TC hub portion 32, mechanically attaches the damper assembly 26 and engine disconnect device 28 to the torque-transmitting output of the engine assembly 12. According to the representative architecture illustrated in FIG. 2, for example, the ICE assembly 12 is equipped with an engine hub 54 that is rigidly mounted to one end of the engine's crankshaft 13. Machined into the flex plate 68 is a circular array of circumferentially spaced fastener holes (not visible in the views provided). These fastener holes receive therethrough threaded bolts 56 or other fasteners that threadably mate with complementary, internally threaded holes in the engine hub 54 to thereby rigidly couple the flex plate 68 directly to the engine hub 54 to rotate in unison with the crankshaft 13. Recognizably, other means of attachment may be used to couple the flex plate 68 to the crankshaft 13. It is also envisioned that the crankshaft 13 be drivingly connected directly to the notch plate 66.

Flex plate 68 drivingly connects the damper assembly 26, disconnect device 28 and, when desired, the torque converter assembly 18 to the engine's 12 crankshaft 13—by way of engine hub 54—such that rotational power is transferable back-and-forth therebetween. In addition to operating to transmit torque produced by the engine 12 to the transmission 16, the flex plate 68 may also function to absorb thrust loads that may be generated by the torque converter 18 hydrodynamics and/or through operation of the disconnect device 28. Projecting radially outward from an outer diameter (OD) edge of the flex plate body is a succession of gear teeth 73—collectively defining a "starter ring gear"—that operatively engage with gear teeth of an engine starter. These gear teeth 73 may thus be used to crank and start the engine 12. In any of the instances in this disclosure where bolts or threaded fasteners are disclosed as a mechanism for connecting two or more components, it should be recognized that other processes may be employed to join those components, such as riveting, welding, forming, etc.

The damper assembly 26 of FIG. 2 is equipped with one or more spring-mass damper systems—also referred to herein as "SDS" and identified as 72 in the drawings—spaced circumferentially around and positioned proximate to the outer periphery of the notch plate 66. These SDS 72 mate the notch plate 66 with the flex plate 68 such that the notch plate 66 and, when operatively engaged, the pocket plate 60 are mechanically coupled to the flex plate 68. In accord with the illustrated example, the notch plate 66 is fabricated with half-cylinder-shaped spring receptacles 75 that are equidistantly spaced along an engine-side surface thereof about the plate 66 body's circumference. While it is envisioned that any logically relevant type of spring element may be employed, the SDS 72 of FIG. 2 each includes a helical spring terminating at each end thereof with a spring cap. Each SDS 72 is seated within a respective one of the spring receptacles 75 such that the length of each helical spring is elongated along the circumference of the plate 66. Recessed into the body of the flex plate 68 are circumferentially spaced spring pockets 77, each of which is radially aligned with a respective receptacle 75 and receives therein a respective one of the SDS helical springs. When the flex plate 68 rotates under the driving power of the engine assembly 12, the spring retainers of each SDS 72 are pressed against respective circumferentially spaced walls of the spring receptacles 75 and pockets 77, thereby compressing the springs. This interaction can be used to absorb and dampen unwanted torsionals produced by the engine 12 during normal, startup, transient and shutdown operations, as some non-limiting examples.

FIGS. 3A and 3B are front-view illustrations of the engine disconnect clutch 28 of FIG. 2, with various constituent parts removed to better illustrate a representative SOWC latching mechanism 80. This latching mechanism 80 is designed to retain the clutch assembly 28 in a disengaged state—with the struts 74 disengaged between the notches 61 and pockets 63—such that the engine assembly output is operatively disengaged from the torque converter input, e.g., without the need for continuous operation of the activation device 78 or other electronic component. As seen in FIG. 3A, for example, the latching mechanism 80 interposed between the pocket plate 60 and the selector plate 62, providing a direct mechanical linkage between the two components. While shown mechanically coupling the pocket plate 60 to the selector plate 62, optional configurations employ the latching mechanism 80 to mechanically couple the pocket plate 60 to the braking ring 64. It is also plausible, e.g., in clutch configurations that eliminate the pocket plate 60, to mechanically couple the selector plate 62 and/or braking ring 64 directly to the torque converter 18 via latching mechanism 80.

The exemplary latching mechanism 80 of FIGS. 3A and 3B is designed to automatically transition from an unlatched state (FIG. 3A) to a latched state (FIG. 3B) in response to the activation device 78 being selectively engaged to rotate the selector plate 62 to the activated position. When in the latched state, the latching mechanism 80 releasably locks the selector plate 62 in its activated position such that the pocket plate engaging elements 74 are retained in a disengaged state, e.g., even after deactuation of the activation device 78. For instance, the latching mechanism 80 of FIGS. 3A and 3B may comprise or, in at least some desired configurations, consist essentially of a latch bar 82 with a latch pin 84, and a hexagonal channel 86 cut into one of the SOWC plates. As shown, latch bar 82 is an elongated, rectilinear, single-piece construction that is rotatably mounted at one end thereof, e.g., via hinge 90, to the selector plate 62 (or, alternatively, to the pocket plate 60 or braking ring 64). The latch pin 84, which may be a cylindrical construction terminating at longitudinal ends thereof with retaining caps, is attached to the latch bar 82 at the opposite end of the hinge 90. Latch pin 84 may be fabricated with a friction reducing coating or jacket to help improve operation of the latching mechanism 80. In addition, while shown with a single latching mechanism 80, the engine disconnect device 28 may be equipped with multiple latching mechanisms similar or differing in construction, location and/or orientation to those shown in the drawings.

Latch pin 84 is slidably mounted in the latch channel 86, which is formed, machined, or otherwise defined in the pocket plate 60 (or, alternatively, in the selector plate 62 or front cover 38 of FIG. 2). According to the representative architecture illustrated in FIGS. 3A and 3B, this channel 86 is fabricated as a continuous slot, i.e., lacking opposing ends. Channel 86 has an elongated polygonal (oblong) shape with rounded corners. A major dimension of the channel 86—from a forward-most corner/point to a rearward-most corner/point—is elongated along the circumference of the pocket plate 60. As indicated above, latch channel 86 may be fabricated with a hexagonal shape that includes a pointed segment 81 (FIG. 3B) at a first circumferential end of the channel 86, and first and second rectilinear segments 83 and 85 (FIG. 3A), respectively, projecting from the pointed segment 81, e.g., at oblique angles with respect to a radial line drawn through the pointed segment 81. The latch channel 86 is also shown with third and fourth rectilinear segments 87 and 89 (FIG. 3A), respectively, that project, e.g., at oblique angles from the first and second rectilinear segments 83, 85, respectively. A detent segment 91 connects the third and fourth rectilinear segments 87, 89 at a second circumferential end of the channel 86.

When the activation device 78 is engaged, the braking ring 64 is slowed or otherwise brought to a stop; this, in turn, causes the selector plate 62 to concomitantly slow/stop. This will cause the selector plate 62 to rotate (e.g., counterclockwise in FIGS. 3A and 3B) with respect to the pocket plate 60. In so doing, the latch bar 82 will pivot on hinge 90 while the latch pin 84 slides from pointed segment 81, through the first and third rectilinear segments 83 and 87, and seats into the detent segment 91. At this juncture, the latch pin 84 catches in the detent 91 to thereby releasably lock the selector plate 62 in the activated position, whereat the selector plate 62 shifts the engaging elements 74 out of engagement between the pockets 63 and notches 61 such that the notch plate 66 is rotatable with respect to the pocket plate 60. To release the latching mechanism 80, the activation device 78 is briefly engaged to cause a temporary shift between the two plates 60, 62. This will cause the latch pin 84 to unseat from detent segment 91; the pin 84 will then transition through the fourth and then second rectilinear segments 89 and 85, and seat in the pointed segment 81 to thereby unlock the selector plate 62 from the activated position.

FIGS. 4A-4D illustrate another representative engine disconnect clutch assembly 128 shown with another representative SOWC latching mechanism 180 that may be implemented via the hybrid vehicle 10 of FIG. 1 to govern operation of the engine disconnect device 28. Like the latching mechanism 80 of FIGS. 3A and 3B, latching mechanism 180 of FIGS. 4A-4D is designed to retain a clutch assembly, such as engine disconnect device 28, in a disengaged state such that the engine assembly is operatively disengaged from the torque converter, e.g., without the need to continuously engage or otherwise operate a selector plate activation device 78. The latching mechanism 180 includes a latching ball 182 that is movably mounted to the braking ring 164 (or, alternatively to the pocket plate 60 or the selector plate 62). In the illustrated example, the latching ball 182 may be slidably seated within a radially elongated channel 181 formed or machined into an inner-diameter surface of the braking ring 164. A biasing member, such as helical spring 184, is shown seated within the channel 181, biasing the latching ball 182 radially inwards towards a superficial detent 186 that is formed, machined or otherwise defined in the pocket plate 162 (or, alternatively, the selector plate 62 or braking ring 164).

When the braking ring 164 brake is not actuated, a return spring 178 biases the selector plate 62 into its deactivated position such that the struts 74 of the pocket plate 60 are engaged with the notch plate 66, as seen in FIGS. 4A and 4C. In this state, an outer diameter surface of the pocket plate 160 presses the latching ball 182 radially outwardly into the channel 181 against the biasing force of the spring 184. Upon actuation of the activation device, such as the selectively engageable activation device 78 of FIG. 2, a rotational braking force F1 (FIG. 4D) is applied to a selector plate 62 via the braking ring 164. This braking force causes the braking ring 164 and selector plate 62 to rotate (e.g., clockwise in FIGS. 4C and 4D) with respect to the pocket plate 160. In so doing, the latching ball 182 aligns with the detent 186 on the outer periphery of the pocket plate 160. The biasing member 184 pushes the latching ball 182 towards the pocket plate 160 and into the detent 186. This functions to releasably lock the selector plate 62 in the activated position, as seen in FIGS. 4B and 4D. To release the latching mechanism 180, an axial force F2 (FIG. 4B) is applied to the pocket plate 160 to unseat the latching ball 182 from the detent 186 and thereby unlock the selector plate 62 from the activated position. In this instance, the activation device is further configured to selectively apply the axial force F2 to the selector plate to unseat the latching ball.

While aspects of the present disclosure have been described in detail with reference to the illustrated embodiments, those skilled in the art will recognize that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined in the appended claims. Moreover, the present concepts expressly include any and all combinations and subcombinations of the preceding elements and features.

What is claimed:

1. A disconnect clutch for selectively connecting an engine assembly to a torque converter, the engine assembly having an output shaft, and the torque converter having input structure to receive engine torque output via the output shaft, the disconnect clutch comprising:
   a pocket plate configured to attach to the input structure of the torque converter, the pocket plate including a plurality of pockets;
   a notch plate configured to attach to the output shaft of the engine assembly, the notch plate including a plurality of notches;

a plurality of engaging elements seated in at least one of the pockets or the notches, the engaging elements being configured to engage the pockets with the notches to thereby lock the pocket plate to the notch plate for common rotation therewith;

a selector plate interposed between the pocket and notch plates, the selector plate being configured to move between a deactivated position, whereat the engaging elements shift into engagement between the pockets and notches, and an activated position, whereat the selector plate shifts the engaging elements out of engagement between the pockets and notches such that the pocket plate is rotatable with respect to the notch plate;

an activation device operatively attached to the selector plate and selectively actuable to move the selector plate from the deactivated position to the activated position; and a latching mechanism interposed between the pocket plate and the selector plate, the latching mechanism being configured to automatically transition from an unlatched state to a latched state in response to the activation device moving the selector plate to the activated position, the latching mechanism, when in the latched state, releasably locking the selector plate in the activated position, the latching mechanism including a latch bar rotatably mounted at one end thereof to one of the pocket or selector plates, and a latch pin attached at another end of the latch bar and slidably mounted in a channel defined in the other of the pocket or selector plates.

2. The disconnect clutch of claim 1, wherein the latch bar is rotatably mounted to the selector plate, and the channel is defined in the pocket plate.

3. The disconnect clutch of claim 1, wherein the channel is a continuous slot having an oblong shape with a major dimension elongated along a circumference of the other of the pocket plate or the selector plate.

4. The disconnect clutch of claim 3, wherein the channel includes a pointed segment at a first circumferential end thereof, first and second rectilinear segments projecting from the pointed segment, third and fourth rectilinear segments projecting obliquely from the first and second rectilinear segments, respectively, and a detent segment connecting the third and fourth rectilinear segments at a second circumferential end of the channel.

5. The disconnect clutch of claim 1, wherein each of the engaging elements includes a strut pivotably seated within a respective one of the pockets of the pocket plate.

6. The disconnect clutch of claim 5, wherein the pockets are circumferentially spaced around the pocket plate, and the notches are circumferentially spaced around the notch plate, the struts engaging the pockets with the notches, to thereby lock the pocket plate to the notch plate, by protruding from the pockets into and abutting the notches.

7. The disconnect clutch of claim 6, wherein the selector plate includes circumferentially spaced windows, and wherein moving the selector plate to the deactivated position aligns each of the windows with a respective one of the pockets such that the strut seated therein projects through the window and into one of the notches of the notch plate.

8. The disconnect clutch of claim 1, further comprising a braking ring attached to the selector plate and configured to rotate the selector plate between the deactivated and activated positions.

9. The disconnect clutch of claim 1, wherein the torque converter includes a front cover with flange and a hub, and wherein the pocket plate is configured to rigidly mount to the flange of the front cover, and the notch plate is configured to rotatably mount onto the hub.

10. A disconnect clutch for selectively connecting an engine assembly to a torque converter, the engine assembly having an output shaft, and the torque converter having input structure to receive engine torque output via the output shaft, the disconnect clutch comprising:

a pocket plate configured to attach to the input structure of the torque converter, the pocket plate including a plurality of pockets;

a notch plate configured to attach to the output shaft of the engine assembly, the notch plate including a plurality of notches;

a plurality of engaging elements seated in at least one of the pockets or the notches, the engaging elements being configured to engage the pockets with the notches to thereby lock the pocket plate to the notch plate for common rotation therewith;

a selector plate interposed between the pocket and notch plates, the selector plate being configured to move between a deactivated position, whereat the engaging elements shift into engagement between the pockets and notches, and an activated position, whereat the selector plate shifts the engaging elements out of engagement between the pockets and notches such that the pocket plate is rotatable with respect to the notch plate;

an activation device operatively attached to the selector plate and selectively actuable to move the selector plate from the deactivated position to the activated position; and a latching mechanism interposed between the pocket plate and the selector plate, the latching mechanism being configured to automatically transition from an unlatched state to a latched state in response to the activation device moving the selector plate to the activated position, the latching mechanism, when in the latched state, releasably locking the selector plate in the activated position, wherein the latching mechanism includes a latching ball movably mounted to one of the pocket plate, the selector plate, or a braking ring attached to the selector plate, the latching mechanism further including a biasing member biasing the latching ball towards a detent defined in the other of the pocket plate, the selector plate, or the braking ring.

11. The disconnect clutch of claim 10, wherein actuation of the activation device applies a rotational braking force to the braking ring, the braking force causing the braking ring to shift with respect to the pocket plate such that the latching ball aligns with the detent, and the biasing member biasing the latching ball to seat inside the detent to thereby retain the selector plate in the activated position.

12. The disconnect clutch of claim 11, wherein the activation device is further configured to selectively apply an axial force to the pocket plate to unseat the latching ball from the detent to thereby unlatch the selector plate from the activated position.

13. The disconnect clutch of claim 10, wherein each of the engaging elements includes a strut pivotably seated within a respective one of the pockets of the pocket plate.

14. The disconnect clutch of claim 13, wherein the pockets are circumferentially spaced around the pocket plate, and the notches are circumferentially spaced around the notch plate, the struts engaging the pockets with the notches, to thereby lock the pocket plate to the notch plate, by protruding from the pockets into and abutting the notches.

15. The disconnect clutch of claim 14, wherein the selector plate includes circumferentially spaced windows, and wherein moving the selector plate to the deactivated position aligns each of the windows with a respective one of the pockets such that the strut seated therein projects through the window and into one of the notches of the notch plate.

16. A disconnect clutch for selectively connecting an engine assembly to a torque converter, the engine assembly having an output shaft, and the torque converter having input structure to receive engine torque output via the output shaft, the disconnect clutch comprising:
  a pocket plate configured to attach to the input structure of the torque converter, the pocket plate including a plurality of pockets;
  a notch plate configured to attach to the output shaft of the engine assembly, the notch plate including a plurality of notches;
  a flex plate adjacent and attached to the notch plate, the flex plate being configured to rigidly attach to the output shaft of the engine assembly for common rotation therewith,
  a plurality of engaging elements seated in at least one of the pockets or the notches, the engaging elements being configured to engage the pockets with the notches to thereby lock the pocket plate to the notch plate for common rotation therewith;
  a selector plate interposed between the pocket and notch plates, the selector plate being configured to move between a deactivated position, whereat the engaging elements shift into engagement between the pockets and notches, and an activated position, whereat the selector plate shifts the engaging elements out of engagement between the pockets and notches such that the pocket plate is rotatable with respect to the notch plate;
  an activation device operatively attached to the selector plate and selectively actuable to move the selector plate from the deactivated position to the activated position; and
  a latching mechanism interposed between the pocket plate and the selector plate, the latching mechanism being configured to automatically transition from an unlatched state to a latched state in response to the activation device moving the selector plate to the activated position, the latching mechanism, when in the latched state, releasably locking the selector plate in the activated position.

17. The disconnect clutch of claim 16, wherein each of the engaging elements includes a strut pivotably seated within a respective one of the pockets of the pocket plate.

18. The disconnect clutch of claim 17, wherein the pockets are circumferentially spaced around the pocket plate, and the notches are circumferentially spaced around the notch plate, the struts engaging the pockets with the notches, to thereby lock the pocket plate to the notch plate, by protruding from the pockets into and abutting the notches.

19. The disconnect clutch of claim 18, wherein the selector plate includes circumferentially spaced windows, and wherein moving the selector plate to the deactivated position aligns each of the windows with a respective one of the pockets such that the strut seated therein projects through the window and into one of the notches of the notch plate.

20. The disconnect clutch of claim 16, further comprising a braking ring attached to the selector plate and configured to rotate the selector plate between the deactivated and activated positions.

* * * * *